US009580665B2

(12) United States Patent
Olofsson et al.

(10) Patent No.: US 9,580,665 B2
(45) Date of Patent: Feb. 28, 2017

(54) COUNTERCURRENT OXYGEN ENHANCED TORREFACTION (75) Inventors: Ingemar Olofsson, Umeå (SE); Martin Nordwaeger, Umeå (SE); Erik Sandström, Sävar (SE); Linda Pommer, Umeå (SE); Anders Nordin, Umeå (SE)

(73) Assignee: BIOENDEV AB, Umea (SE)

( * ) Notice: Subject to any disclaimer, the term of this patent is extended or adjusted under 35 U.S.C. 154(b) by 566 days.

(21) Appl. No.: 14/123,602

(22) PCT Filed: May 16, 2012

(86) PCT No.: PCT/SE2012/050534
§ 371 (c)(1),
(2), (4) Date: Mar. 18, 2014

(87) PCT Pub. No.: WO2012/158118
PCT Pub. Date: Nov. 22, 2012

(65) Prior Publication Data
US 2014/0208995 A1    Jul. 31, 2014

(30) Foreign Application Priority Data

May 18, 2011  (SE) .................................. 1150462-8
May 18, 2011  (SE) .................................. 1150463-6
(Continued)

(51) Int. Cl.
*C10L 5/44* (2006.01)
*C10L 5/36* (2006.01)
(Continued)

(52) U.S. Cl.
CPC ............. *C10L 5/447* (2013.01); *C10L 5/366* (2013.01); *C10L 9/083* (2013.01); *F23G 5/033* (2013.01);
(Continued)

(58) Field of Classification Search
CPC ........................................................ C10L 5/447
See application file for complete search history.

(56) References Cited

U.S. PATENT DOCUMENTS 3,501,380 A    3/1970  Perch
3,888,621 A    6/1975  Williams
(Continued)

FOREIGN PATENT DOCUMENTS

CN    101379167 A    3/2009
DE    30 41 627 A1    6/1982
(Continued)

OTHER PUBLICATIONS

Arias B. et al. "Influence of torrefaction on the grindability and reactivity of woody biomass", Oct. 23, 2007 Elsevier B.V., *Fuel Processing Technology*, vol. 89, No. 2, 169-175, (2008).
(Continued)

*Primary Examiner* — Ellen McAvoy
(74) *Attorney, Agent, or Firm* — Myers Bigel, P.A.

(57) ABSTRACT

The invention relates to a method of torrefaction of an optionally predried biomass in a torrefaction reactor such that torrefied biomass and torrefaction gases are obtained, and wherein an oxygen-containing gas is supplied to the torrefaction reactor at a first position in the reactor such that oxygen reacts with components of the torrefaction gases under the formation of heat and wherein torrefaction gases are withdrawn from the torrefaction reactor at a second position of the torrefaction reactor and wherein the first position is located downstream of the second position in relation to a biomass transport direction in the torrefaction reactor such that the torrefaction gases moves through the torrefaction reactor countercurrent with the biomass transport and wherein the optionally predried biomass has a temperature of between 30° C. and 230° C., preferably
(Continued)

between 50° C. and 200° C., most preferably between 60° C. and 180° C. when entering the torrefaction rector.

14 Claims, 3 Drawing Sheets

(30) Foreign Application Priority Data

| | | | |
|---|---|---|---|
| May 18, 2011 | (SE) | ................................... | 1150464-4 |
| May 18, 2011 | (SE) | ................................... | 1150465-1 |
| Nov. 10, 2011 | (SE) | ................................... | 1151062-5 |

(51) Int. Cl.
*C10L 9/08* (2006.01)
*F26B 23/02* (2006.01)
*F23G 5/033* (2006.01)
*F26B 17/20* (2006.01)

(52) U.S. Cl.
CPC ............ *F26B 23/022* (2013.01); *F26B 17/20* (2013.01); *F26B 2200/02* (2013.01); *Y02E 50/10* (2013.01); *Y02E 50/15* (2013.01); *Y02E 50/30* (2013.01)

(56) References Cited

U.S. PATENT DOCUMENTS

| | | | | |
|---|---|---|---|---|
| 4,344,819 | A | 8/1982 | Gerdes, Jr. | |
| 5,017,269 | A | 5/1991 | Loomans et al. | |
| 5,728,361 | A | 3/1998 | Holley | |
| 7,901,663 | B2 | 3/2011 | Lenglet | |
| 8,105,400 | B2 * | 1/2012 | Bergman | ................ C10B 53/02 202/118 |
| 8,276,289 | B2 * | 10/2012 | Causer | .................... C10B 49/02 122/22 |
| 8,541,637 | B2 * | 9/2013 | Babicki | ..................... C01B 3/56 201/25 |
| 8,668,753 | B2 * | 3/2014 | Goetsch | .................... C01B 3/50 48/197 R |
| 2003/0221363 | A1 | 12/2003 | Reed | |
| 2004/0148795 | A1 | 8/2004 | Bernon et al. | |
| 2005/0160667 | A1 | 7/2005 | Weinberg et al. | |
| 2008/0263891 | A1 | 10/2008 | Brunet | |
| 2009/0007484 | A1 | 1/2009 | Smith | |
| 2009/0084029 | A1 | 4/2009 | Bergman | |
| 2009/0250331 | A1 | 10/2009 | Hopkins et al. | |
| 2010/0083530 | A1 | 4/2010 | Weisselberg et al. | |
| 2010/0101141 | A1 | 4/2010 | Shulenberger et al. | |
| 2010/0162619 | A1 | 7/2010 | Peus | |
| 2010/0223839 | A1 | 9/2010 | Garcia Perez et al. | |
| 2010/0242351 | A1 | 9/2010 | Causer | |
| 2010/0270505 | A1 | 10/2010 | Gallaspy et al. | |
| 2011/0019981 | A1 | 1/2011 | Sanz Garcia et al. | |
| 2011/0041392 | A1 | 2/2011 | Stromberg et al. | |
| 2011/0252698 | A1 | 10/2011 | Camper et al. | |

FOREIGN PATENT DOCUMENTS

| | | |
|---|---|---|
| DE | 10 2005 038 135 B3 | 3/2007 |
| EP | 0 081 246 A2 | 6/1983 |
| EP | 0 081 246 A3 | 6/1983 |
| EP | 2 287 278 A2 | 2/2011 |
| EP | 2 385 096 A2 | 11/2011 |
| GB | 2448531 A | 10/2008 |
| JP | 51-114976 | 10/1976 |
| JP | 51-115205 | 10/1976 |
| JP | 55-042058 | 3/1980 |
| KR | 101012861 B1 | 2/2011 |
| WO | WO 92/17744 A1 | 10/1992 |
| WO | WO 2007/078199 A1 | 7/2007 |
| WO | WO 2009/151367 A1 | 12/2009 |
| WO | WO 2010/001137 A2 | 1/2010 |
| WO | WO 2010/001137 A3 | 1/2010 |
| WO | WO 2010/045320 A2 | 4/2010 |
| WO | WO 2010/063029 A1 | 6/2010 |
| WO | WO2010/068099 A1 | 6/2010 |
| WO | WO 2010/129988 A1 | 11/2010 |
| WO | WO 2010/130988 A1 | 11/2010 |
| WO | WO 2011/112526 A2 | 9/2011 |
| WO | WO 2011/119470 A1 | 9/2011 |
| WO | WO 2011/123025 A1 | 10/2011 |

OTHER PUBLICATIONS

Chinese First Office Action Corresponding to Chinese Patent Application No. 2012800298151; Issuing Date: Sep. 4, 2014, English Translation, 8 Pages.
European Search Report Corresponding to European Patent Application No. 12 786 568.1; Dated: Sep. 8, 2014; 8 Pages.
European Supplementary Search Report Corresponding to European Patent Application No. 12 78 4918.0; Dated: Feb. 4, 2015; 5 Pages.
European Supplementary Search Report Corresponding to European Patent Application No. 12 78 6558.2; Dated: Feb. 6, 2015; 7 Pages.
International Preliminary Report on Patentability Corresponding to International Application No. PCT/SE2012/050529; Date of Issuance: Nov. 19, 2013, 5 Pages.
International Preliminary Report on Patentability Corresponding to International Application No. PCT/SE2012/050531; Date of Issuance: Nov. 19, 2013; 6 Pages.
International Preliminary Report on Patentability for PCT/SE2012/050527: Date of Completion: Mar. 13, 2013, 12 Pages.
International Search Report and Written Opinion Corresponding to International Application No. PCT/SE2012/050529; Date of Mailing: Aug. 28, 2012; 8 Pages.
International Search Report and Written Opinion Corresponding to International Application No. PCT/SE2012/050531; Date of Mailing: Aug. 29, 2012; 10 Pages.
Communication with Supplementary European Search Report, EP 12 78 5686, Sep. 8, 2014.
English language translation—The First Office Action, Chinese Patent Application No. 201280029970.3, Aug. 20, 2014.
International Search Report, PCT/SE2012/050534, Sep. 3, 2012.
Written Opinion of the International Searching Authority, PCT/SE2012/050534, Sep. 3, 2012.
International Preliminary Report on Patentability, PCT/SE2012/050534, Apr. 24, 2013.

* cited by examiner

COUNTERCURRENT OXYGEN ENHANCED TORREFACTION

CROSS REFERENCE TO RELATED APPLICATION

This application is a 35 U.S.C. §371 national stage application of PCT International Application No. PCT/SE2012/050534, filed on 16 May 2012, which claims priority from Swedish Patent Application No. 1150462-8, filed May 18, 2011, Swedish Patent Application No. 1150463-6, filed May 18, 2011, Swedish Patent Application No. 1150464-4, filed May 18, 2011, Swedish Patent Application No. 1150465-1, filed May 18, 2011, and Swedish Patent Application No. 1151062-5, filed Nov. 10, 2011; the disclosures of which are hereby incorporated herein by reference in their entirety. The above-referenced PCT International Application was published in the English language as International Publication No. WO 2012/158118 A1 on 22 Nov. 2012.

TECHNICAL FIELD

The present invention relates to the field of torrefaction of biomass. In particular it relates to a torrefaction process which increases the energy yield in the torrefaction process, increases the energy density of the torrefied material and reduces the energy needed for grinding the torrefied material into a fine powder.

BACKGROUND

To be able to compete with and replace fossil fuel energy carriers such as coal, oil and natural gas, lignocellulosic biomass would benefit from some form of pre-treatment method to overcome inherent drawbacks. The pre-treatment method torrefaction has been shown to improve biomass fuel qualities such as heating value, energy density, water content, milling characteristics, feeding and hydrophobic properties [1-4]. These improvements establish torrefaction as a key process in facilitating an expanding market for biomass raw materials. Torrefaction is a thermal pre-treatment method that normally takes place in a substantially inert (oxygen free) atmosphere at a temperature of about 220-600° C. During the process course a combustible gas comprising different organic compounds is released from the biomass feedstock in addition to the torrefied biomass.

The process of producing a torrefied material from lignocellulosic biomass can be said to include four stages:
1) a drying step, wherein free water retained in the biomass is removed;
2) a heating step in which physically bound water is released and the temperature of the material is elevated to the desired torrefaction temperature;
3) a torrefaction stage, in which the material is actually torrefied and which starts when the material temperature reaches about 220° C.-230° C. During this stage, the biomass partly decomposes and releases different types of volatiles, such as hydroxy acetone, methanol, propanal, short carboxylic acids and other hydro carbons. In particular, the torrefaction stage is characterized by decomposition of hemicellulose at temperatures from 220° C.-230° C., and at higher torrefaction temperatures cellulose and lignin also starts to decompose and release volatiles; cellulose decomposes at a temperature of 305-375° C. and lignin gradually decomposes over a temperature range of 250-500° C.;
4) a cooling step to terminate the process and facilitate handling. The torrefaction process is terminated as soon as the material is cooled below 220° C.-230° C.

SUMMARY OF THE PRESENT DISCLOSURE

Compared to fossil fuels such as coal, oil and natural gas, fuels based on renewable biomass have been described to suffer from lower heating value, lower energy density and therefore higher transportation costs. Torrefaction of biomass in combination with densification, such as pelletisation or briquetting has been described as a promising step to increase the energy density and to reduce the costs of transport and storage of the biomass since torrefied pellets and briquettes may be more dense, have lower moisture content, higher heating value and higher stability during storage compared to the biomass they are made of. Since a large proportion of the existing power plants for production of thermal energy and electricity are designed for fossil fuels, such as fossil coal, it would be advantages if torrefied biomass could be used as a fuel in these preexisting plants. One such type of power plants is pulverized coal power plants which are designed to burn pulverized coal. It would be advantageous if the torrefied biomass could be processed to a fine powder using the same equipment without adaptations in such existing pulverized coal-fired plants. Another advantage with powder from torrefied material is that it may be used in existing coal powder gasification processes for production of synthesis gas. However milling of the torrefied biomass is an energy demanding process and thus it is important to keep the energy needed for milling of the torrefied material in to a powder as low as possible. The present inventors have thus realized that there is a need for a torrefaction process which decreases the energy needed for grinding of a torrefied biomass in to a fine powder.

In many cases pressurized boiler systems (or gasification systems) are preferred since the size of these boilers (or gasification systems) can be kept smaller than non pressurized systems. Feeding in such systems is usually more efficient and cheaper if a pumpable slurry is used instead of a powder that needs expensive compression work to feed the fuel into the high pressure. Therefore many of these systems are designed for using pumbable fules such as liquids and slurries. To be able to use torrefied biomass as a fuel in such boilers and gasification systems the torrefied biomass can be grinded to a powder and mixed with a liquid to produce a pumpable slurry or an extrudable paste.

If the heating value of the torrefied material is high, it would be possible to at least partly use water to dilute the pulverized torrefied material. This would be advantages since no (or less) transport and handling of other liquid fuels would be necessary. However, if the heating value of the torrefied material is low, addition of water can be unfeasible since the low energy value of the produced slurry can prevent efficient burning of the slurry in the boiler. Therefore, it is highly desirable to have a high heating value of the torrefied biomass. Besides from facilitating the use of a water based slurry as fuel in a pressurized system, a material with high heating value followed by densification with increased energy density also decreases transportation and storage costs. The present inventors have therefore realized that there is a need for an improved torrefaction processes which increases the heating value of torrefied biomass.

Torrefaction of raw biomass includes steps of drying the biomass to reduce the moisture content, heating the biomass to the torrefaction temperature and torrefying the biomass at the desired torrefaction temperature. All these steps demand energy in the form of heating. The present inventors have realized that the size of the torrefaction reactor can be kept smaller and thus cheaper if the heating and torrefaction process is fast. To keep the costs down it is also important to utilize the energy as efficient as possible. Therefore, the present inventors have realized that there is a demand for an improved and more energy efficient torrefaction process which also decreases the heating and torrefaction time.

The present invention surprisingly solves the problems stated above by providing a torrefaction process which compared to known torrefaction processes.

1) Increases the heating value at a fixed energy yield
2) Increases the energy yield in the torrefaction process at a fixed heating value
3) Decreases the energy needed for grinding of a torrefied biomass in to a fine powder at a fixed energy yield
4) Increases the energy yield, mass yield and heating value and decreases the energy needed for grinding to a fine powder at a fixed torrefaction degree.
5) Is more energy efficient and decreases the heating and torrefaction time A first aspect of the invention relates to a method of torrefaction of an optionally predried biomass in a torrefaction reactor such that torrefied biomass and torrefaction gases are obtained, and wherein an oxygen-containing gas is supplied to the torrefaction reactor at a first position in the reactor such that oxygen reacts with components of the torrefaction gases under the formation of heat and wherein torrefaction gases are withdrawn from the torrefaction reactor at a second position of the torrefaction reactor and wherein the first position is located downstream of the second position in relation to a biomass transport direction in the torrefaction reactor such that the torrefaction gases moves through the torrefaction reactor countercurrent with the biomass transport and wherein the optionally predried biomass has a temperature of between 30° C. and 225° C., preferably between 50° C. and 200° C., preferably between 60° C. and 180° C. when entering the torrefaction rector.

A second aspect of the invention relates to a method for producing a pulverized torrefied biomass comprising the following steps:
a) torrefaction of an optionally predried biomass in a torrefaction reactor such that torrefied biomass and torrefaction gases are obtained, and wherein an oxygen-containing gas is supplied to the torrefaction reactor at a first position in the reactor such that oxygen reacts with components of the torrefaction gases under the formation of heat and wherein torrefaction gases are withdrawn from the torrefaction reactor at a second position of the torrefaction reactor and wherein the first position is located downstream of the second position in relation to a biomass transport direction in the torrefaction reactor such that the torrefaction gases moves through the torrefaction reactor countercurrent with the biomass transport
b) milling the obtained torrefied biomass such that a pulverized torrefied biomass is obtained, wherein the pulverized torrefied biomass preferably comprises particles having an average diameter of less than 1000 microns, preferably less than 500 microns, preferably less than 200 microns, preferably less than 100 microns.

A third aspect of the invention relates to use of a pulverized torrefied biomass or a slurry or an extrudable paste produced according to the methods of the invention for production of heat and/or electricity in a combustion process or for production of synthetic gas in a gasification process.

A forth aspect of the invention relates to a system for torrefaction of a biomass, comprising a torrefaction reactor for torrefying the biomass having a biomass inlet and a biomass outlet wherein biomass can be transported in a biomass transport direction from the biomass inlet to the biomass outlet during a torrefaction process, wherein the torrefaction reactor further comprises at least one gas inlet for injection of an oxygen containing gas to the reactor and wherein the gas inlet is connected to oxygen supply means for a controlled supply of an oxygen-containing gas to the torrefaction reactor and wherein the torrefaction reactor further comprises an outlet for torrefaction gases and wherein the outlet for torrefaction gases is located upstream of the gas inlet in relation to a biomass transport direction within the reactor and wherein the system further is comprising a source of the oxygen-containing gas, which source is connected to the oxygen supply means.

DEFINITIONS

Torrefaction:
A thermal pre-treatment method that takes place in a virtually inert (oxygen free) atmosphere at a temperature above 220° C. but below 600° C. and which produces a torrefied biomass and combustible gases (referred to as torrefaction gases in the present disclosure). During a torrefaction stage, parts of the biomass, in particular hemicellulose, decompose and give off different types of organic volatiles. In a torrefaction process starting from raw biomass, the actual torrefaction stage is preceded by a drying stage wherein free water retained in the biomass is removed and by a heating stage wherein the biomass is heated to the desired torrefaction temperature.

Oxygen Enhanced Torrefaction (OET):
Torrefaction with injection of a controlled amount of oxygen inside the torrefaction reactor in order to supply heat to the torrefaction reaction in terms of partial combustion of the torrefaction constituents.

Heating Value/Higher Heating Value (HHV):
The energy released during complete combustion in the presence of oxygen of a mass portion of dry biomass, when cooling and condensing the combustion products back to 25° C.

Energy Density:
The energy released during complete combustion in the presence of oxygen of a volume portion of dry biomass with or without cooling and condensing the combustion products back to 25° C.

Mass Density:
The mass of dry biomass per unit of volume

Mass Yield:
The ratio of mass retained in the torrefied, m_tor, product compared to the initial biomass, m_feed, on dry and ash free basis:

$$\eta_m = \left(\frac{m_{tor}}{m_{feed}}\right)_{daf}$$

Energy Yield:
The ratio of energy retained in the torrefied product compared to the initial biomass per unit of mass of inlet feed on dry and ash free basis:

$$\eta_E = \eta_m \left(\frac{HHV_{tor}}{HHV_{feed}}\right)_{daf}$$

Torrefaction Degree:
The degree of torrefaction based on the Chemical Bonding Energy (CBE) per unit of biomass is calculated taking the ratio of the CBE of the torrefied and initial biomass respectively:

$$\text{Torrefaction degree} = 1 - \frac{CBE_{daf,tor}}{CBE_{daf,ref}}$$

The CBE is calculated as the difference between the theoretical heating value per kilogram of dry and ash free biomass and the real/actual heating value per kilogram of dry and ash free biomass. The theoretical heating value is calculated putting all energy containing elemental compounds at their ground state, i.e. carbon as C(s), hydrogen as $H_2(g)$ and sulphur as S(s). The theoretical heating value is then calculated using Hess law:

$$\Delta H_{f,r}^{\theta} = \Sigma \nu_{P_i} \Delta H_{P_i}^{\theta} - \Sigma \nu_{R_i} \Delta H_{R_i}^{\theta}$$

and recalculating the formation enthalpy on MJ/kg_daf. The formation enthalpies for the elemental compounds stated above can be found in any thermochemical handbook.

Torrefaction Time:
The time the material is subjected to torrefaction; i.e. the time the temperature of the material is kept above 220° C.

Torrefaction Residence Time:
The time the biomass is inside the torrefaction reactor.

Transport Screw:
Any type of helicoidal material transport devices including discontinuous helicoidal transport devices. The helicoidal transport device can be fixed to a central shaft or to the inner casing of a compartment, such as a drum, surrounding the transport screw.

Lambda Value:
The lambda value is the ratio between the present mass of oxygen and the needed mass of oxygen for complete combustion of a portion of biomass or carbonaceous material. A lambda value equal to 1 represents stoichiometric combustion, i.e. complete combustion. A lambda value above 1 represents "over stoichiometric" combustion with excess of oxygen. A lambda value below 1 represents "under stoichiometric" combustion with a deficit of oxygen. The mass of oxygen needed for stoichiometric combustion is calculated using the fuel composition of the biomass or carbonaceous material.

DETAILED DESCRIPTION

During a torrefaction process torrefaction gases are released from the biomass which leads to a decrease in mass and energy yield of the torrefied product. The present inventors have realized that both the energy yield and the heating value, of the torrefied material can be increased if the gases released during the torrefaction process can be returned to the torrefied biomass. The present inventors have further realized that this can be achieved by condensation of the produced torrefaction gases onto the torrefied material during the torrefaction process. The inventors have further realized that the torrefaction gases released at high temperatures also have the highest molecular weight, highest condensation temperatures and also the highest energy content compared to the gases released at lower torrefaction temperatures. Therefore the present inventors have realized that it is particularly beneficial to condense the gas components produced at the highest temperatures onto the biomass to be, being or has been torrefied in order to increase the energy yield.

According to the present invention this can be achieved by a torrefaction process where the temperature of the biomass at a first position in a torrefaction reactor is significantly higher than the temperature of the biomass in a second part of the torrefaction reactor and wherein the second position is located further upstream and wherein torrefaction gases released from the biomass during the torrefaction reaction are withdrawn from the torrefaction reactor at the second position of the torrefaction reactor. Thereby torrefaction gases released will condense on the cold material in the upstream part of the torrefaction reactor as it moves through the reactor countercurrent with the biomass transport. The present inventors have surprisingly discovered that the condensed gases present on the colder biomass are not totally volatilized when the biomass is heated to the highest temperature further downstream in the reactor. In fact, the present inventors have shown that the condensed gases are to a substantial degree retained on the torrefied biomass material despite the temperature increase, which leads to an increase of both the energy yield and heating value, see example 2 and table 1.

The present inventors have further realized that one particularly preferred way of achieving a significantly higher temperature of the biomass in a downstream part of a torrefaction reactor than of the biomass in the upstream part of the torrefaction reactor is by introducing small amounts of oxygen containing gas (e.g. air, oxygen or oxygen enriched air) at the downstream part of the torrefaction reactor and withdrawing torrefaction gas in the upstream part of the torrefaction reactor. The injected air or oxygen or oxygen enriched air reacts with gases released from the biomass during the heating and/or torrefaction stage. When the gases partly oxidize, heat is released to the surrounding gas and the material to be torrefied, thereby increasing the temperature. The temperature will be highest in the part of the reactor where the air or oxygen or oxygen enriched air reacts, and the temperature will gradually decrease as the hot gases are drawn countercurrent with the biomass transport towards the part of the torrefaction reactor where the torrefaction gases are withdrawn. Thereby the hot torrefaction gases will condense on the colder biomass located further upstream in the reactor. The present inventors have surprisingly discovered that this leads to both an increased energy yield and an increased heating value of the torrefied material, see table 1 and example 2. This is surprising since increased energy yield is known to lead to increased mass yield which generally lead to a decrease in heating value.

Besides of achieving a significantly higher temperature of the biomass in a downstream part of the torrefaction reactor than in the upstream part of the torrefaction reactor, injection of oxygen into a torrefaction arrangement also have the potential to reduce the heating and torrefaction time due to higher heat transfer coefficients, and thus a comparably smaller and cheaper torrefaction arrangement can be used in the torrefaction process compared to if the supply of heat was exclusively relying on indirect heating using heat exchangers.

In order to get high levels of condensation of torrefaction gases on the material in the upstream part of the torrefaction reactor it is beneficial if the biomass introduced through an inlet of the torrefaction reactor has a temperature significantly below the temperature of the biomass in the downstream part of the reactor. Therefore it is beneficial if the temperature of the biomass introduced at the inlet of the torrefaction rector has a temperature below 230° C., preferably below 200° C., preferably below 180° C.

However if the temperature is to low, such as below 50° C. the present inventors have discovered that the countercurrent withdrawal of torrefaction released gases may result in uneven water condensation on the optionally pre-dried material which in turn prolongs the heating time for the wettest biomass particles which will produce biomass with uneven torrefaction degree. The present inventors have realized that this problem is particularly apparent at temperatures below 30° C. but is to some extent apparent even at temperature about 50° C. Therefore the temperature of the biomass introduced at the upstream part of the reactor should preferably be between 30° C. and 225° C., preferably between 40° C. and 225° C., such as between 50° C. and 225° C., more preferably between 50° C. and 200° C., most preferably between 60° C. and 180° C.

Thus, a first aspect of the invention relates to a method of torrefaction of an optionally predried biomass in a torrefaction reactor such that torrefied biomass and torrefaction gases are obtained, and wherein an oxygen-containing gas is supplied to the torrefaction reactor at a first position in the reactor such that oxygen reacts with components of the torrefaction gases under the formation of heat and wherein torrefaction gases are withdrawn from the torrefaction reactor at a second position of the torrefaction reactor and wherein the first position is located downstream of the second position in relation to a biomass transport direction in the torrefaction reactor such that the torrefaction gases moves through the torrefaction reactor countercurrent with the biomass transport and wherein the optionally predried biomass has a temperature of between 30° C. and 225° C., preferably between 50° C. and 200° C., preferably between 60° C. and 180° C. when entering the torrefaction rector The torrefaction gases are preferably withdrawn from the torrefaction reactor via an outlet for torrefaction gases which preferably is located close to the inlet of the torrefaction reactor.

Oxygen containing gas can preferably be injected in more than one position in the reactor, such as in more than 3 or more than 5 positions. Multiple oxygen injection positions are particularly beneficial in large reactors since the demand of oxygen for heating such a reactor is higher due to increased biomass fill ratio and the flow of oxygen needed from one single point can potentially be as high that it is hard to control the temperature in the torrefaction reactor with a single injection point. The position(s) for addition of oxygen containing gas can preferably be adjusted such that the oxygen containing gas can be supplied at (a) position(s) where a temperature increase is needed the most. For example if the temperature of the gases or the temperature of the biomass in the torrefaction reactor is below a desired value at a specific position, oxygen containing gas can be inject at this specific position to increase the temperature at said position.

The present inventors have surprisingly discovered that the energy needed for milling a torrefied material, produced according to a method of the present invention, into a fine powder is about 2.5 times less (corresponding to a milling energy decrease of about 60%) than the energy needed for milling a torrefied material produced by conventional torrefaction methods at the same energy yields, see example 2. A fine powder of torrefied material can for example be used as a fuel in pulverized coal heat and power plants or in gasification processes for production of e.g. product gas or synthesis gas. Milling of torrefied biomass is an energy demanding process and thus it is important to keep the energy needed for milling of the torrefied material to a powder as low as possible. Hence, the method according to the present invention is particularly suitable for production of a fine powder from the torrefied material. Therefore, in one embodiment the method is further comprising a step of milling the obtained torrefied biomass such that a pulverized torrefied biomass is obtained. In order to be suitable as a fuel in pulverized coal power plants or in gasification processes the average diameter of the particles in the pulverized torrefied biomass should be less than 500 microns, preferably less than 200 microns, preferably less than 100 microns. Thus, in one embodiment the pulverized torrefied biomass comprises particles having an average diameter of less than 500 microns, preferably less than 200 microns, preferably less than 100 microns.

A second aspect of the invention relates to a method for producing a pulverized torrefied biomass comprising the following steps:

a) torrefaction of an optionally predried biomass in a torrefaction reactor such that torrefied biomass and torrefaction gases are obtained, and wherein an oxygen-containing gas is supplied to the torrefaction reactor at a first position in the reactor such that oxygen reacts with components of the torrefaction gases under the formation of heat and wherein torrefaction gases are withdrawn from the torrefaction reactor at a second position of the torrefaction reactor and wherein the first position is located downstream of the second position in relation to a biomass transport direction in the torrefaction reactor such that the torrefaction gases moves through the torrefaction reactor countercurrent with the biomass transport b) milling the obtained torrefied biomass such that a pulverized torrefied biomass is obtained, wherein the pulverized torrefied biomass preferably comprises particles having an average diameter of less than 500 microns, preferably less than 200 microns, preferably less than 100 microns.

Sometimes pressurized boiler systems or gasification systems are preferred since the size of such systems can be kept smaller than non-pressurized systems. Feeding in these kinds of systems is usually more efficient and cheaper if slurry is used instead of a powder and thus many of theses systems are designed for using pumbable or extrudable fules such as liquids, slurries and pastes. To be able to use torrefied biomass as a fuel in such boilers and gasification systems the torrefied biomass can be grinded to a powder and mixed with a liquid to produce a pumpable slurry or extrudable paste. If the heating value of the torrefied material is high it would be possible to at least partly use water to dilute the pulverized torrefied material. This would be advantages since no (or less) transport and handling of other liquid fuels would be necessary. However, if the heating value of the torrefied material is low, addition of water can be unfeasible since the low heating value of the produced slurry can prevent efficient burning or gasification of the slurry in the boiler. Therefore, when making slurries suitable for gasification or combustion in pressurized systems, it is highly desirable to have a high heating value of the torrefied biomass. Due to the efficient condensation of torrefaction gas on the torrefied material produced according to the present invention, the energy yield and also the heating value is higher compared to torrefied material, torrefied to the same torrefaction degree, using conventional torrefaction methods. Since the methods according to the present invention leads to condensation of torrefaction gases on to the torrefied material the method also have the potential to increase the hydrophobicity of the torrefied material which also is a desirable feature of the torrefied material, in particularly when it is used for making pumpable slurries suitable for gasification or combustion in pressurized systems. Generally the higher hydrophobicity allows for a lower suspended solids concentration of the slurry. Thus the method according to the present invention is particularly suitable for production of a pumpable slurry or extrudable paste of torrefied material.

In order to be pumpable the suspended solid concentration of hydrophobic materials should preferably not be higher than 80% (w/w). Torrefied materials are known to not be totally hydrophobic, i.e. the material will gain some moisture when it is subjected to water, therefore a larger fraction of water will be needed to make it extrudable or pumpable. Due to the lower heating value of the slurry compared to the raw material the suspended solid concentration of a slurry produced from torrefied biomass torrefied with conventional methods should preferably not be lower than 70% (w/w). However the higher heating value (and potentially the higher hydrophobicity) of the torrefied material produced according to the methods of the present invention allow for higher water content in the slurry and for a lower suspended solid concentration compared to torrefied materials produced using conventional methods, such as a suspended solids concentration below 70%.

Accordingly, in one embodiment the method further comprise a step of adding a liquid to the pulverized torrefied biomass to obtain a slurry having a concentration of 40% (w/w) to 80% (w/w) of solid torrefied biomass. In one embodiment the liquid comprises water, pyrolysis oil, condensed torrefaction gases, glycerol and/or a hydrocarbon liquid. In one embodiment the liquid mainly consists of water, pyrolysis oil, condensed torrefaction gases, glycerol and/or a hydrocarbon liquid, such as at least 50%, such as at least 70%, such as least 90%. In one embodiment the liquid mainly consists of water and the obtained slurry has a concentration of 70% (w/w) to 80% (w/w) of solid torrefied biomass. In one embodiment the liquid comprises at least 50% water, such as at least 75% water, such as at least 90% water.

In one embodiment the slurry or paste from powderized torrefied material may be subjected to heating and pressurizing prior to combustion or gasification in order to decrease the viscosity of the slurry/paste and thereby allow a higher content of solids.

As mentioned above, condensation of torrefaction gases on the biomass in the torrefaction reactor is dependent upon that the temperature of the material is colder in an upstream part of the reactor compared to in a downstream part of the reactor such that the torrefaction gases condense on to the colder material as they are drawn in the opposite direction to the material transport. Therefore it is beneficial if the biomass introduced through an inlet of the torrefaction reactor has a temperature significantly below the temperature of the biomass in the downstream part of the reactor. Thus, in a preferred embodiment the optionally predried biomass introduced at the inlet of the torrefaction rector has a temperature below 180° C. In another embodiment the optionally pre-dried biomass introduced at the inlet of the torrefaction rector has a temperature of between 60° C. and 180° C. In one embodiment the temperature of the biomass at the first position in the torrefaction reactor is at least 50° C., preferably at least 100° C., preferably at least 150° C. higher than the temperature of the biomass in the second position located upstream of the first position in the torrefaction reactor. In one embodiment the temperature of the biomass at the first position in above 300° C. In one embodiment the temperature of the biomass at the first position is between 280° C. and 400° C., such as between 300° C. and 400° C. In one embodiment the temperature of the biomass at the second position is between 30° C. and 230° C. preferably between 50° C. and 200° C., more preferably between 60° C. and 180°. In one embodiment part of the torrefaction gases condense on the biomass in the torrefaction reactor as the torrefaction gases moves through the torrefaction reactor countercurrent with the biomass transport. In one embodiment the condensation of torrefaction gases on the biomass in the torrefaction reactor increases the energy yield with at least 1% such as at least 5% compared to if no torrefaction gas is condensed on the material. In one embodiment the energy yield of the torrefied material is at least 70%, preferably at least 75%, preferably at least 80% preferably at least 85% such as at least 90%.

The inventive concept of the present invention partly includes that torrefaction gases should condense on the material present in the torrefaction reactor. The remaining torrefaction gases which have not been condensed out can be at or very close to its condensation point when they reach the second position in the reactor where it is withdrawn from the reactor. To avoid further condensation of these gases on cold surfaces in or connected to the outlet for torrefaction gases causing clogging and/or plugging, some oxygen containing gas can also be injected at this position to increase the temperature of the torrefaction gas. Increasing the temperature of the gases at this position will avoid condensation of these gases on cold surfaces in or connected to the outlet for torrefaction gases. The gas ducts for gases exiting/leaving torrefaction reactors are conventionally externally heated to avoid condensation of the torrefaction gases. Adding controlled amounts of oxygen containing gases will increase the temperature of the torrefaction gases and will reduce or even eliminate the need for external heating of the gas ducts/channels. The gases withdrawn from the torrefaction reactor can preferably be combusted e.g. for the production of heat. Even though some of the energy in the withdrawn gases have been extracted through condensation and partial combustion of energy rich gases on the biomass in the torrefaction reactor, the present inventors have demonstrated that the gases still are suitable for combustion, see example 3 and FIG. 2b.

The inventors have also shown that the temperature in the torrefaction zone can be controlled by controlling the amount of injected oxygen. The fact that the temperature in the torrefaction reactor can be kept stable and controlled in the presence of oxygen and without oxidation of the biomass is surprising. Further, in the torrefaction processes described in the prior art, efforts have rather been made to ensure that the torrefaction process is performed in an oxygen depleted manner. Therefore the present invention, where a controlled amount of oxygen is injected to the torrefaction arrangement, provides an energy efficient torrefaction process which also has the potential to decrease heating time and thus facilitate the use of a smaller and more cost effective torrefaction arrangement. Therefore, in one embodiment the temperature in the torrefaction reactor is controlled at least partly by controlling the amount of oxygen added to the torrefaction reactor at the first position in the torrefaction reactor.

The inventors have further realized that exothermal, temperature-increasing reactions takes place during the torrefaction process and that the amount of generated energy differs considerably between different types of lignocellulosic materials. For example, the inventors have discovered that the torrefaction of reed canary grass or eucalyptus generates considerably more energy by exothermal reactions than the torrefaction of spruce. The exothermal reactions in the torrefaction process thus makes it hard to control the torrefaction temperature and to obtain a torrefied product of a desired and reproducible quality. The present inventors have solved this problem by cooling the torrefaction reaction so as to at least partly counteract a temperature increase derived from the exothermic torrefaction reactions.

Therefore in one embodiment, the method further comprises cooling the torrefaction reaction so as to at least partly counteract a temperature increase derived from exothermic torrefaction reactions. In one embodiment the cooling of the torrefaction reaction involves a step of injecting cooling media into the torrefaction reactor such that the cooling media is in direct contact with at least part of the said torrefaction reaction. In one embodiment the cooling media is selected from solids, liquids and/or gases or a mixture thereof. A liquid cooling media might be beneficial since the cooling effect can be large. For example, if a liquid cooling media is used, said liquid will evaporate within the torrefaction reactor. This evaporation increases the cooling effect and can therefore facilitate a swift regulation of the temperature of the torrefaction reaction and reduce the amount and consumption of cooling media. One suitable liquid is water since water is inexpensive safe and abundant. However one would expect that a drawback with using water is that the torrefaction gases, present within the torrefaction reactor, will be diluted by the steam formed from the evaporated water. The torrefaction gases are often used for combustion and if the torrefaction gases are diluted above a certain level the gases will be less suitable for combustion. However, the present inventors have surprisingly discovered that in order to regulate a torrefaction reaction and to keep the temperature stable, surprisingly small amounts of liquid water needs to be injected in the torrefaction reactor. The present inventors have demonstrated that the use of water as cooling media only have minor effect on the combustibility of the torrefaction gas. The present inventors have thus realized that liquid water is a suitable cooling media for direct cooling of a torrefaction reaction to counteract a temperature increase derived from exothermic torrefaction reactions. Therefore, in a preferred embodiment the cooling media is a liquid. In another preferred embodiment the liquid comprises water, for example the liquid can comprise at least 50% (w/w) water, such as at least 75% (w/w) water, such as at least 95% (w/w) water such as at least 99% (w/w) water. Other liquids can also be used as a cooling media, alone or in combination with water. One such liquid is condensed torrefaction gas. Gas given off during a torrefaction process comprises organic compounds. This torrefaction gas can be collected from a torrefaction arrangement and be condensed in to an oily, tar-rich liquid, for example by lowering the temperature of the torrefaction gas. Other examples of suitable liquid cooling medias are pyrolysis oil, thermal oils, different petro-chemical liquids, and other liquids comprising organic compounds. The present inventors have also realized that the cooling effect of a liquid can be increased if the liquid is in the form of small particles, such as aerosol or small droplets, such as a spray. By injecting a cooling media in the form of small droplets or aerosol into the torrefaction reactor the media will be more evenly distributed and the cooling will therefore be more efficient and thus less liquid is needed. Thereby the torrefaction gases will be less diluted than if for example a liquid stream or larger liquid droplets with less distribution where used. Therefore, in one preferred embodiment the cooling media is injected in to the torrefaction reactor as an aerosol. In one embodiment cooling media is injected in to the torrefaction reactor as small droplets having an average diameter below 1000 μm, such as 500 μm such as below 300 μm such as below 150 μm. In another embodiment cooling of the torrefaction reaction is performed indirectly using heat exchangers.

The present invention facilitates a swift torrefaction process since the injected oxygen is increasing the temperature but the process can still be controlled. Therefore the torrefaction retention times can be kept short. Thus in one embodiment the torrefaction time is less than 12 minutes, such as less than 10 minutes, such as less than 8 minutes.

In one embodiment the oxygen-containing gas is pure oxygen or an oxygen-containing gas mixture such as air or oxygen enriched air. In a most preferred embodiment, the oxygen-containing gas is air. In one embodiment the amount of injected oxygen is controlled such that at least 95% of the introduced oxygen is consumed by reactions with the formed gases. In one embodiment a controlled amount of the oxygen containing gas is added such as that the lambda value is in the range of 0.001-0.1 and preferably in the range of 0.002-0.05.

In one embodiment the biomass is lignocellulosic biomass. In one embodiment the lignocellulosic biomass is a plant material such as an agriculture residue or a forestry residue such as a wood material, such as soft wood or hard wood. In one embodiment the wood material is wood chips and in one embodiment the wood chips is in between 1 and 10 cm across in size. In one embodiment the biomass is a selected from spruce, eucalyptus, reed canary grass, straw, birch, pine and/or alder.

The torrefaction arrangement used in the present invention should be suitable for injection of a controllable amount of oxygen containing gas at a first position and for withdrawing torrefaction gases at a second position located upstream of the first position such that torrefaction gases released during the torrefaction reaction is drawn counter-current in relation to the biomass transport in the reactor. Examples of torrefaction reactors suitable for the present invention therefore include torrefaction reactors comprising at least one rotatable drum and wherein the biomass transport is regulated by the rotational speed of the at least one rotatable drum. It also includes torrefaction reactors comprising at least one transport screw and wherein the biomass transport is regulated by the rotational speed of the at least one transport screw. Torrefaction reactors where the torrefaction gases can not be drawn countercurrent with a biomass transport are not suitable for the present invention. Examples of such non-suitable reactors includes for example fluidized bed reactors. Thus in one embodiment the torrefaction reactor comprises at least one rotatable drum and the biomass transport is regulated by the rotational speed of the at least one rotatable drum. However, the present inventors have realized that the most energy efficient reactor for torrefaction of a biomass according to the present invention comprises a non rotating drum and at least one transport screw in the form of a helicoidal material transport device fixed to a central shaft wherein the biomass transport is regulated by the rotational speed of the at least one transport screw. Therefore, in a preferred embodiment the torrefaction reactor comprises at least one transport screw and the biomass transport is regulated by the rotational speed of the at least one transport screw. In one embodiment the at least one transport screw comprises a continuous or discontinuous helicoidal material transport device fixed to a central shaft. In another preferred embodiment the at least one transport screw comprises a continuous or discontinuous helicoidal material transport device fixed to an inner casing of a compartment surrounding the transport screw.

The present inventors have realized that low biomass moisture content is highly beneficial for the partial oxidation reaction, through direct injection of oxygen, inside the torrefaction reactor. A high moisture content of the predried biomass will demand a high heat release rate through partial combustion of the torrefaction gases for drying of the biomass. The present inventors have realized that such an increase in moisture content leads to a dilution of the torrefaction gas which make the partial oxidation reaction less effective, in particular at lower temperatures. This will in turn demand a higher gas release rate which might need to be achieved by an increase in residence time and/or torrefaction temperature. The present inventors have realized that increased residence time and/or torrefaction temperature is not optimal since it results in decreased mass- and energy yield of the torrefied product. Furthermore, increased residence time and/or torrefaction temperature also leads to an increase in the decomposition of the biomass components, i.e. lignin, cellulose and hemicellulose. Primarily lignin has proven to be an important binder in the densification process to pellets or briquettes and with little or none natural binder. Thereby, if the residence time and/or torrefaction temperature is high some type of binder might have to be added in the densification process which in turn leads to increased operating costs. Accordingly, the present inventors have realized that the disadvantages related to long residence times and/or high torrefaction temperatures can be avoided if a predrying step is preceding the torrefaction step. Therefore, in one embodiment the method further comprises a step of predrying the biomass to a moisture content below 15% (w/w), preferably below 10% (w/w) most preferably below 5% (w/w), such as below 4% (w/w) prior to torrefaction.

The predrying can either be performed in a separate dryer or in a predrier integrated with the torrefaction reactor such that predried material is directly fed from an outlet of the predrier to the inlet of the torrefaction reactor. In one embodiment the temperature of the biomass is in between 30° C. and 225° C., such as between 50° C. and 200° C. when the biomass exits the predrier and when it enters the torrefaction reactor. In a most preferred embodiment the temperature of the biomass is in between 60° C. and 180° C. when the biomass exits the predrier and when it enters the torrefaction reactor. Thereby the temperature is high enough to avoid substantial condensation of water present in the torrefaction gases, i.e. re-moisturizing of the raw biomass, but low enough to get a high level of condensation of torrefaction gas on the colder material in the upstream part of torrefaction reactor, as the hot torrefaction gases are drawn countercurrent with the biomass transport direction.

After torrefaction the torrefied material is preferably cooled to terminate the torrefaction process and to facilitate handling. This can for example be achieved by introduction of the torrefied material in a screw cooler and/or by application of water to the torrefied material. However, during the cooling process of torrefied material, the material continues to release gases until the temperature of the material is decreased below about 200° C. The material preferably needs to be further cooled to below 130° C. to ensure safe self ignition temperatures. The release of gases from the torrefied material during the cooling process leads to a decrease in energy yield of the torrefied product. Therefore, the present inventors have realized that in order to even further increase the energy yield, it is desirable to also condense the gases given of at the cooling process on to the torrefied material.

The present inventors have solved this problem by a method of cooling the torrefied material by applying water to the torrefied material to reduce the temperature of the torrefied material followed by a step wherein the torrefied material is further cooled in a cooling device, (e.g. a screw cooler) together with at least part of the torrefaction gases generated from the material during and/or prior to the application of water to the material. Since the torrefied material introduced in to the cooling device already have been pre-cooled by the application of water to the material, the torrefaction gases directed in to the cooling device will at least partly condense on the torrefied biomass.

Thus in one embodiment the method further comprises the step of
i) applying water to the torrefied material to reduce the temperature of the torrefied material, provided that the temperature is not reduced below 120° C., preferably not below 150° C. most preferably not below 190° C.
ii) further cooling the torrefied material and at least part of the torrefaction gases generated from the material during step i) and/or prior to step i) and/or after step i) in a common cooling device such that components of the torrefaction gases condenses in the common cooling device.

As discussed above a torrefied biomass produced according to the present invention is particularly suitable for grinding in to a fine powder partly because the present method surprisingly reduce the energy needed in the grinding process with about 2.5 times (corresponding to a milling energy decrease of about 60%) compared to torrefied materials produced in a conventional torrefaction reactor. Furthermore the powder produced by the method according to the present invention is particularly suitable for making into a slurry or extrudable paste which for example can be used in pressurized systems for production of heat, electricity, product gas and/or synthesis gas. One of the advantages with the powder produced according to the present invention is that the heating value and the hydrophobicity, is higher than in torrefied material produced using conventional methods.

Thereby it is possible to make a slurry having a lower suspended solids concentration which still have a high enough energy value which is important both in the combustion and gasification processes. A low suspended solids concentration is important for the pumpability of the slurry.

Thus a third aspect of the invention relates to use of a pulverized torrefied biomass or a slurry produced according to any of the embodiments of the first and/or second aspects of the invention for production of heat and/or electricity in a combustion process or for production of product gas or synthesis gas in a gasification process.

A forth aspect of the invention relates to a system for the torrefaction of a biomass, comprising a torrefaction reactor for torrefying the biomass having a biomass inlet and a biomass outlet wherein biomass can be transported from the biomass inlet to the biomass outlet in a biomass transport direction during a torrefaction process, wherein the torrefaction reactor further comprises at least one gas inlet for injection of an oxygen containing gas to the reactor and wherein the gas inlet is connected to oxygen supply means for a controlled supply of an oxygen-containing gas to the torrefaction reactor and wherein the torrefaction reactor further comprises an outlet for torrefaction gases and wherein the outlet for torrefaction gases is located upstream of the gas inlet in relation to a biomass transport direction within the reactor and wherein the system further is comprising a source of the oxygen-containing gas, which source is connected to the oxygen supply means.

In one embodiment the torrefaction reactor comprises at least one transport screw and the biomass transport is regulated by the rotational speed of the at least one transport screw. In one embodiment the torrefaction reactor comprises at least one rotatable drum and the biomass transport can be regulated by the rotational speed of the at least one rotatable drum. In one embodiment the at least one transport screw comprises a continuous or discontinuous helicoidal material transport device fixed to a central shaft. In one embodiment the oxygen supply means comprises a valve for controlling the amount of supplied oxygen. In one embodiment a fan or a compressor or a pump is connected to the oxygen supply means so that oxygen can be introduced into the torrefaction reactor. In one embodiment the source of the oxygen-containing gas is a pressure vessel such as a gas cylinder or a gas tube. In one embodiment the source of the oxygen-containing gas is free air.

In one embodiment the outlet for torrefaction gases is connected to an under pressure creating device such that torrefaction gases can be withdrawn through the torrefaction gas outlet by means of a created under pressure and such that torrefaction gases can be drawn countercurrent with the biomass transport. In one embodiment the under pressure creating device is a fan or an ejector or an ejector burner.

Figure 2A:
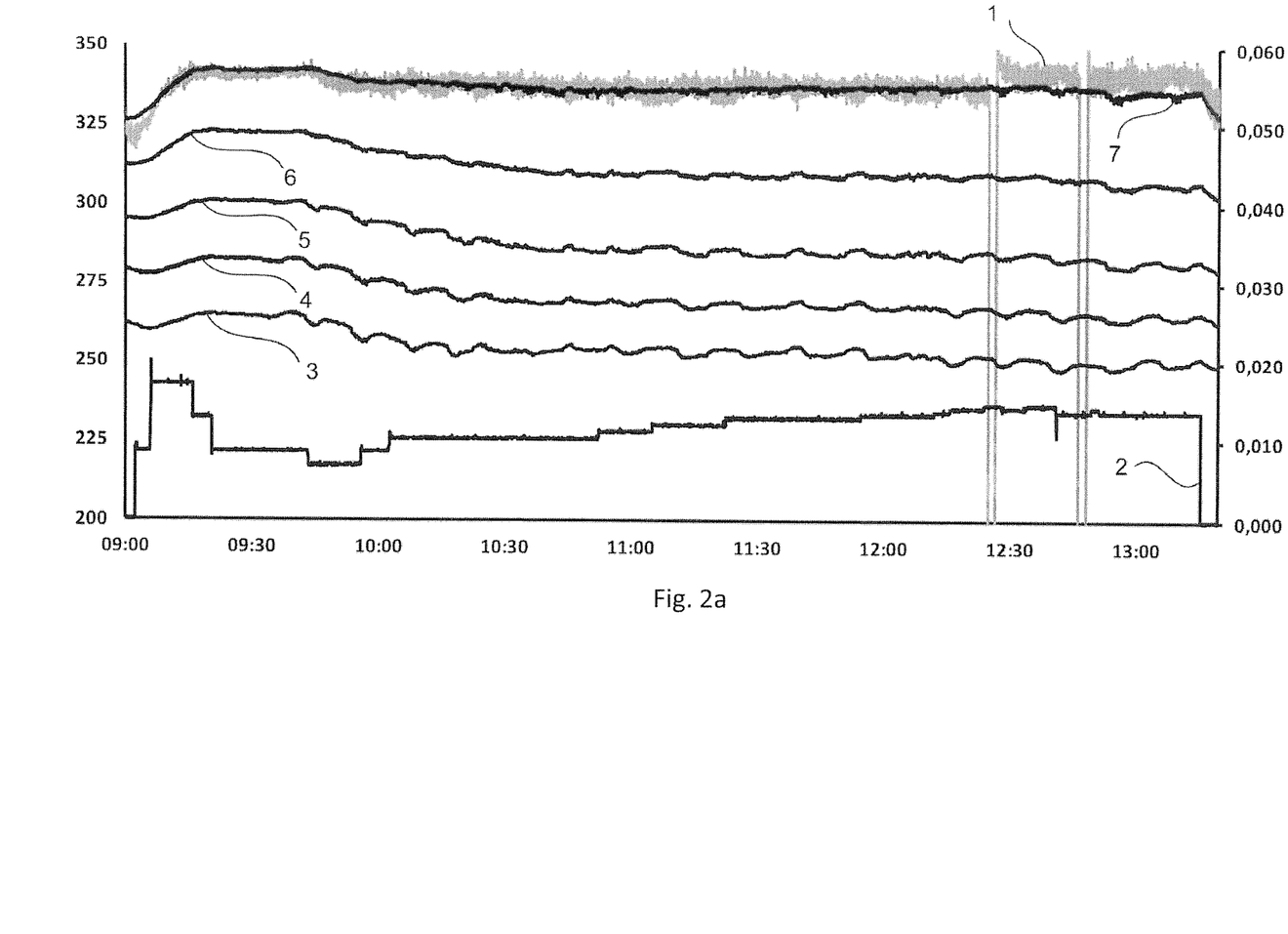
FIG. 2a shows the torrefaction of a wood mixture at 338° C. biomass surface temperature with countercurrent gas flow during injection of air and 7.5 minutes residence time. Curve (1) shows the biomass surface exit temperature, curve (2) shows the corresponding lambda value, curve (3-7) shows the gas temperatures in the centre of the torrefaction drum, where (3) is closest to the inlet and (7) is closest to the exit.
Figure 2B:
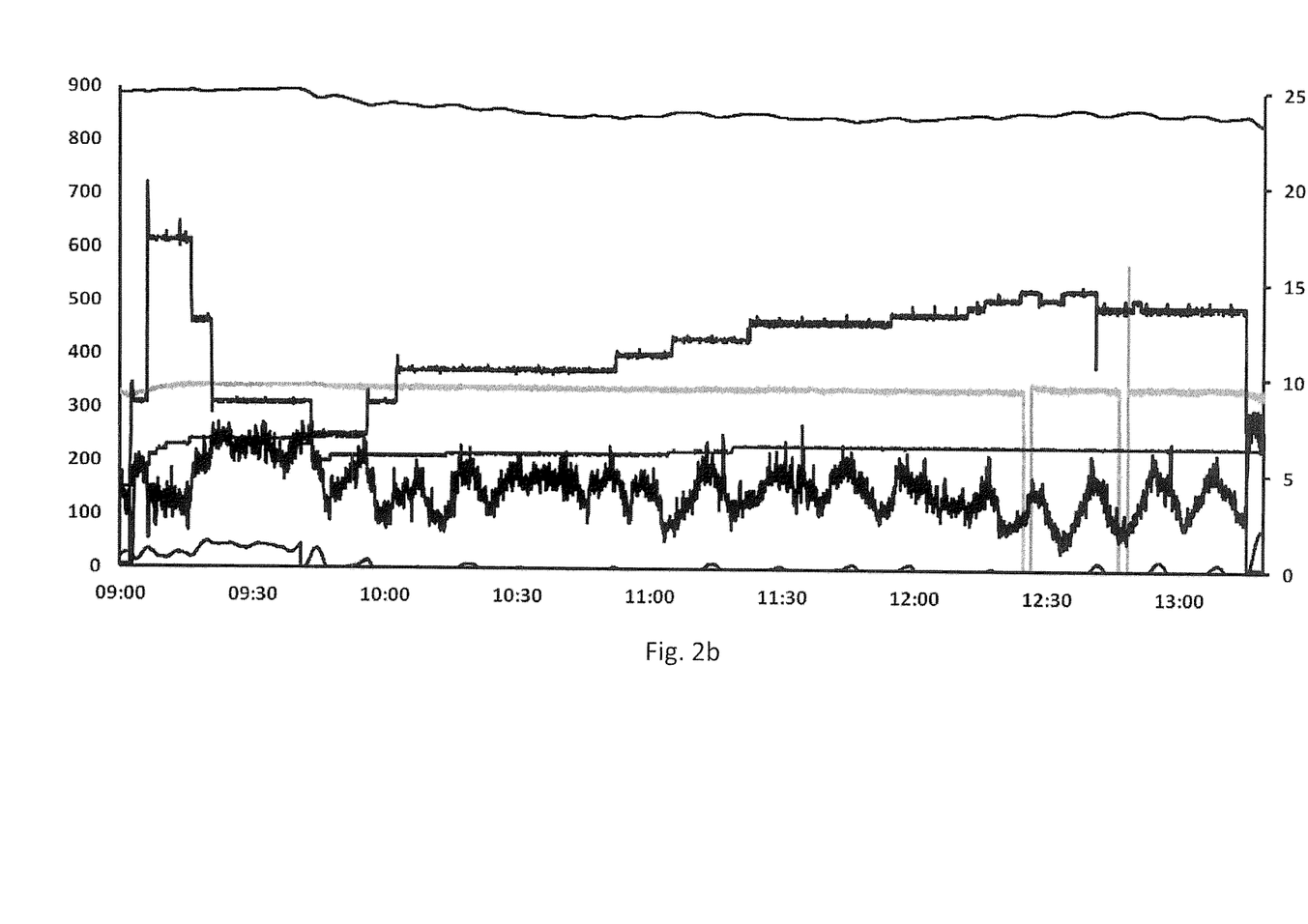
FIG. 2b shows the combustibility of the torrefaction generated gas during torrefaction of the wood mixture at 338° C. biomass surface temperature with countercurrent gas flow during injection of air and 7.5 minutes residence time. Curve (1) shows the biomass surface exit temperature, curve (2) shows the corresponding lambda value, curve (3) shows the surface temperature in the beginning of the gas burner, curve (4) shows effect in kW of the electrical heater around the gas burner, curve (5) shows the oxygen content in the flue gases after the gas burner, curve (6) shows the combustion air flow in normal liters per minute into the gas burner.

The present inventors have demonstrated that the method according to the present invention does not to a large extent affect the combustibility of the withdrawn torrefaction gases, see example 3 and FIG. 2b. Therefore the withdrawn torrefaction gases can be combusted in a combustion chamber for production of energy as heat. Thus, in one embodiment the outlet for torrefaction gases is connected to a combustion chamber for combustion of withdrawn torrefaction gases. In one embodiment the under pressure creating device is connected in between the combustion chamber and the outlet for torrefaction gases.

The embodiments of the first, second, third, and forth aspects applies to each other mutatis mutandis.

DETAILED DESCRIPTION OF EXEMPLARY EMBODIMENTS

Example 1

Figure 1:
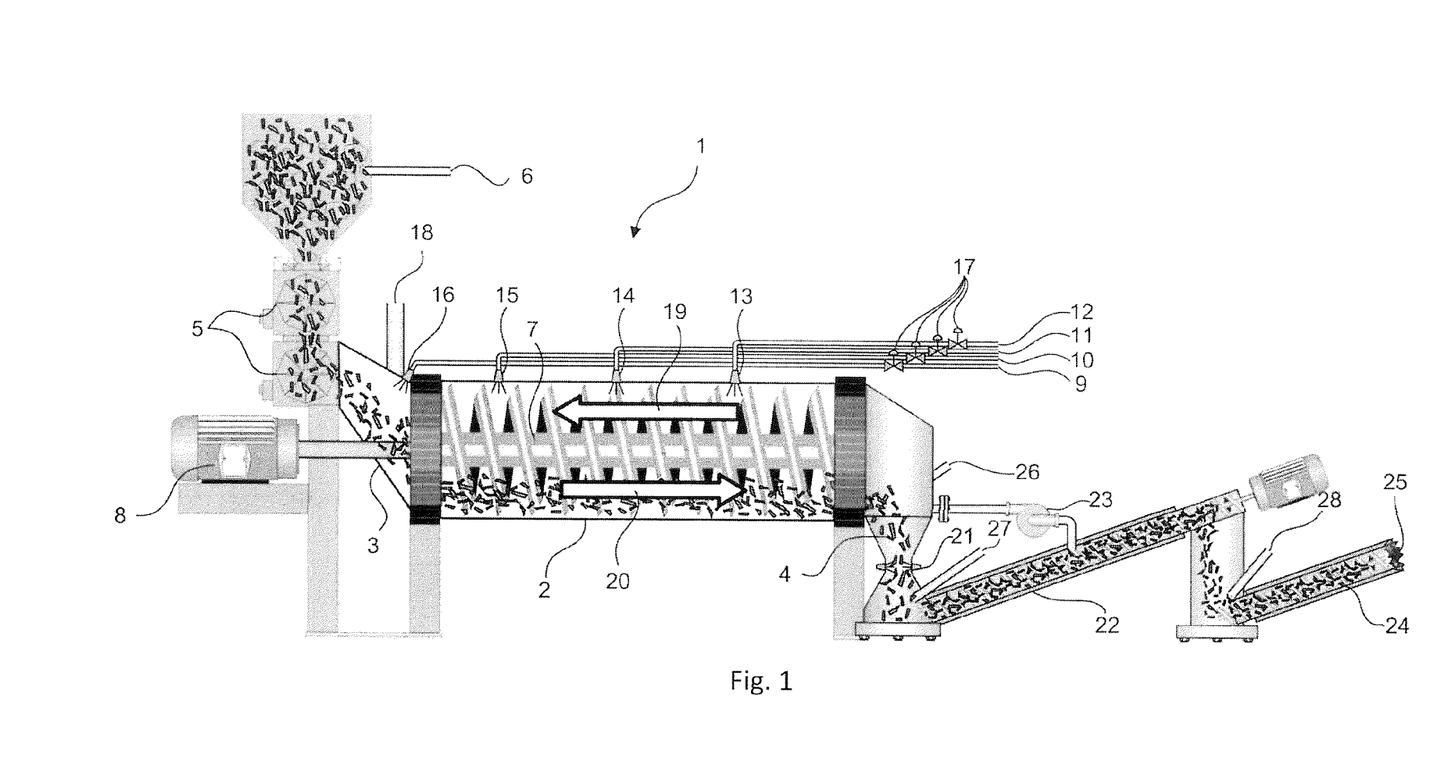
FIG. 1 shows a torrefaction arrangement suitable for producing torrefied material according to the method of the present invention.

FIG. 1 shows a system for the torrefaction of a biomass (1) comprising a torrefaction reactor (2) having a biomass inlet (3) and a biomass outlet (4). The biomass is predried to a moisture content of about 5% (w/w) prior to feeding the biomass in to the torrefaction reactor (2) via rotary vane feeders (5). The moisture content in the biomass is controlled by a moisture probe (6). When the biomass enters the torrefaction reactor (2) via the biomass inlet (3) the temperature of the biomass is about 100° C. The biomass is transported through the torrefaction reactor (2) by means of a transport screw (7) which comprises helicoidal material transport device fixed to a central shaft (7). The speed of the biomass transport is regulated by the rotational speed of the transport screw (7) which is driven by a transport screw engine (8). An oxygen containing gas is injected to the torrefaction reaction via a gas inlet for injection of an oxygen containing gas (9, 10, 11, 12). The oxygen containing gas inlets (13, 14, 15, 16) are connected to valves (17) which controls the supply of oxygen-containing gas to the torrefaction reactor (2). A source of the oxygen-containing gas (9, 10, 11, 12) is connected to the oxygen supply means. The injected oxygen containing gas reacts with gases released from the biomass during the heating or torrefaction stage. When the gases oxidize, heat is released to the surrounding gas and the material to be torrefied, thereby increasing the temperature. Gases given of from the biomass during the torrefaction process are withdrawn at an outlet for torrefaction gases (18). Thereby the torrefaction gases will be transported countercurrent in relation to the transport direction of the biomass. The upper arrow (19) in the figure indicates the transport direction of the torrefaction gases while the lower arrow (20) indicates the transport direction of the biomass. The temperature in the torrefaction reactor will be highest in the downstream part of the reactor where the oxygen is injected and the temperature will gradually decrease as the hot gases are drawn countercurrent with the biomass transport towards the upstream part of the reactor (2). Thereby the torrefaction gases are condensing on the colder material in the upstream part of the torrefaction reactor (2). Some oxygen may be injected through an inlet (16) close to or within the torrefaction gas exit (18) to increase the gas temperature above the dew point to avoid condensation close to or within the gas exit (18), thus partly, or completely eliminating the need for external heating of the gas duct/channel connected to the gas exit (18). The biomass exits the torrefaction reactor (2) via the biomass outlet (4) and is thereafter quench cooled in a water application device (21). The torrefied material that has passed the water application device (21) is fed to a first screw cooler (22) for further cooling the torrefied material together with torrefaction gases such that components of the torrefaction gases condenses in the screw cooler (22), e.g. on the torrefied material. Part of remaining torrefaction gases can be sucked through and withdrawn from the screw cooler (22) by means of a fan (23) and transferred back to the biomass outlet (4). The torrefied material can be further cooled in a second screw cooler (24) and cold torrefied material having a temperature below 100° C. exits the system for the torrefaction of a biomass (1) via a second screw cooler biomass outlet (25). IR-thermometers (26, 27, 28) for measuring the surface temperature of the torrefied material are located upstream of the screw coolers (22,24).

Example 2

Torrefaction of biomass was performed in a continuous torrefaction pilot plant having a torrefaction reactor comprising a 1.7 m long rotating drum with an internal screw fixed to the drum. A heated transport screw before the torrefaction reactor acted as a preheater and heated the bone-dry biomass to about 150° C.

In the torrefaction reference experiments, external electrical heaters heated the reactor. The heaters were controlled so that an isothermal drum surface temperature was reached and so that the biomass was heated to the final torrefaction temperature read at the exit of the torrefaction reactor through an IR-thermometer. The torrefaction gases were flowing concurrently with the biomass and withdrawn from the torrefaction reactor at the end of the reactor.

In the "counter current oxygen enhanced torrefaction experiments" (CC-OET) all external electrical drum heaters were turned off except for the electrically heated preheater. Oxygen containing gas was injected adjacent to the biomass exit in the end of the drum and the torrefaction gases were withdrawn from the end of the pre-heating transport screw, immediately before the torrefaction reactor. Thereby gas was flowing countercurrent to the biomass flow and part of the torrefaction released gases condensed on the material in the torrefaction reactor. Active regulation of the introduced oxygen containing gas controlled the temperature in the torrefaction reactor and the resulting biomass exit temperature (measured by an IR-thermometer).

In all experiments an indirectly water-cooled transport screw was cooling the biomass after the torrefaction reactor. The exiting torrefaction gases were combusted in an externally electrically heated gas burner.

Results

As shown in table 1 the energy needed for milling a fine powder from the torrefied material, produced using the counter current oxygen enhanced torrefaction method described above is about 2.6 times less (−62%) than the energy needed for milling a torrefied material which have been torrefied using the reference method described above and having the same energy yield.

TABLE 1

CC-OET change compared to reference (conventional method). Reference experiments are selected on three different basis; A, B and C. CC-OET experiments are the same for A, B and C. The reference experiments are not the same for A, B and C.

| | EY | MY | HHV | TF-degree | Milling energy |
|---|---|---|---|---|---|
| A: OET and ref has similar EY | 0% | −5% | 5% | 43% | −62% |
| B: OET and ref has similar HHV | 8% | 8% | 0% | −17% | 2% |
| C: OET and ref has similar TF-degree | 5% | 3% | 2% | 0% | −19% |

As shown in table 1, the energy yield for a biomass, produced using the counter-current oxygen enhanced torrefaction method described above, is about 5% higher than the energy yield of the reference biomass being torrefied to the same torrefaction degree by the reference method described above.

As shown in table 1, the energy yield in the torrefaction process for a biomass torrefied by the method according to the present invention is about 8% higher than the biomass torrefied using the reference method at the same heating value.

As shown in table 1 the heating value in the torrefaction process for a biomass torrefied by the method according to the present invention is about 5% higher than the biomass torrefied using the reference method at the same energy yield.

As shown in table 1 the heating value in the torrefaction process for a biomass torrefied by the method according to the present invention is about 2% higher than the biomass torrefied using the reference method at the same torrefaction degree.

Example 3

FIG. 2a shows that the temperature of the biomass can be kept stable using the method according to the present invention. In this experiment a wood mixture was torrefied at a biomass surface temperature of about 338° C. with countercurrent gas flow during injection of air and 7.5 minutes residence time. At time 12:00 the process was determined to be at steady-state. The x-axis shows the time in hours:minutes, the left y-axis shows the temperature and the right y-axis shows the lambda value. Curve (1) shows the biomass surface exit temperature, curve (2) shows the corresponding lambda value, curve (3-7) shows the gas temperatures in the centre of the torrefaction drum, where (3) is closest to the biomass inlet and (7) is closest to the biomass exit.

FIG. 2b shows the combustibility of the torrefaction generated gas during torrefaction of the wood mixture at 338° C. biomass surface temperature with countercurrent gas flow during injection of air and 7.5 minutes residence time. At time 12:00 the process was determined to be at steady-state. The x-axis shows the time in hours:minutes. The left y-axis shows the temperature and flow in normal liter per minute. The right y-axis shows the lambda value*10^3, effect in kW and oxygen partial pressure in %. Curve (1) shows the biomass surface exit temperature, curve (2) shows the corresponding lambda value, curve (3) shows the surface temperature in the beginning of the gas burner, curve (4) shows effect in kW of the electrical heater around the gas burner, curve (5) shows the oxygen content in the flue gases after the gas burner, curve (6) shows the combustion air flow in normal liters per minute into the gas burner. This demonstrates that the gas withdrawn from the reactor in the method described above is suitable for combustion.

REFERENCES

[1] M. J Prins et al. More efficient biomass gasification via torrefaction. Energy 2006, 31, (15), 3458-3470.
[2] P. C. A. Bergman et al. Torrefaction for Entrained Flow Gasification of Biomass; Report C-05-067; Energy Research Centre of The Netherlands (ECN): Petten, The Netherlands, July 2005;
[3] K. Håkansson et al. Torrefaction and gasification of hydrolysis residue. 16th European biomass conference and exhibition, Valencia, Spain. ETAFlorence, 2008.
[4] A. Nordin, L. Pommer, I. Olofsson, K. Håkansson, M. Nordwaeger, S. Wiklund Lindström, M. Broström, T. Lestander, H. Örberg, G. Kalén, Swedish Torrefaction R&D program. First Annual Report 2009-12-18 (2009).

The invention claimed is:

1. A method of torrefaction of an optionally predried biomass in a torrefaction reactor such that torrefied biomass and torrefaction gases are obtained, and wherein an oxygen-containing gas is supplied to the torrefaction reactor at a first position in the reactor such that oxygen reacts with components of the torrefaction gases under the formation of heat and wherein torrefaction gases are withdrawn from the torrefaction reactor at a second position of the torrefaction reactor and wherein the first position is located downstream of the second position in relation to a biomass transport direction in the torrefaction reactor such that the torrefaction gases moves through the torrefaction reactor countercurrent to the biomass transport and wherein the optionally predried biomass has a temperature of between 30° C. and 230° C. when entering the torrefaction rector.

2. A method according to claim 1 further comprising a step of milling the obtained torrefied biomass such that a pulverized torrefied biomass is obtained.

3. A method for producing a pulverized torrefied biomass comprising the following steps:
   a) torrefaction of an optionally predried biomass in a torrefaction reactor such that torrefied biomass and torrefaction gases are obtained, and wherein an oxygen-containing gas is supplied to the torrefaction reactor at a first position in the reactor such that oxygen reacts with components of the torrefaction gases under the formation of heat and wherein torrefaction gases are withdrawn from the torrefaction reactor at a second position of the torrefaction reactor and wherein the first position is located downstream of the second position in relation to a biomass transport direction in the torrefaction reactor such that the torrefaction gases moves through the torrefaction reactor countercurrent to the biomass transport
   b) milling the obtained torrefied biomass such that a pulverized torrefied biomass is obtained.

4. Method according to claim 2 wherein the pulverized torrefied biomass comprises particles having an average diameter of less than 1000 microns.

5. Method according to claim 1 further comprising a step of adding a liquid to the pulverized torrefied biomass to obtain a slurry or an extrudable paste having a concentration of 40% (w/w) to 80% (w/w) of solid torrefied biomass.

6. Method according to claim 5 wherein the liquid mainly consists of water and wherein the obtained slurry or extrudable paste has a concentration of 70% (w/w) to 80% (w/w) of solid torrefied biomass.

7. Method according to claim 1 wherein the optionally predried biomass introduced at the inlet of the torrefaction rector has a temperature below 225° C.

8. Method according to claim 1 wherein the optionally predried biomass introduced at the inlet of the torrefaction rector has a temperature of between 30° C. and 230° C.

9. Method according to claim 1 wherein the temperature of the biomass at the first position in the torrefaction reactor is at least 50° C. higher than the temperature of the biomass in the second position located upstream of the first position in the torrefaction reactor.

10. Method according to claim 1 wherein part of the torrefaction gases condense on the biomass in the torrefaction reactor as the torrefaction gases moves through the torrefaction reactor countercurrent with the biomass transport.

11. Method according to claim 1 wherein the biomass is lignocellulosic biomass, such as an agriculture residue or a forestry residue such as a wood material, such as wood chips.

12. A system for torrefaction of a biomass, comprising a torrefaction reactor for torrefying the biomass having a biomass inlet and a biomass outlet wherein biomass can be transported from the biomass inlet to the biomass outlet in a biomass transport direction during a torrefaction process, wherein the torrefaction reactor further comprises at least one gas inlet for injection of an oxygen containing gas to the reactor and wherein the gas inlet is connected to oxygen supply means for a controlled supply of an oxygen-containing gas to the torrefaction reactor and wherein the torrefaction reactor further comprises an outlet for torrefaction gases and wherein the outlet for torrefaction gases is located upstream of the gas inlet in relation to a biomass transport direction within the reactor and wherein the system further is comprising a source of the oxygen-containing gas, which source is connected to the oxygen supply means.

13. System according to claim 12 wherein the torrefaction reactor comprises at least one transport screw and the biomass transport is regulated by the rotational speed of the at least one transport screw.

14. System according to claim 13 wherein the at least one transport screw comprises a continuous or discontinuous helicoidal material transport device fixed to a central shaft.

* * * * *

UNITED STATES PATENT AND TRADEMARK OFFICE
CERTIFICATE OF CORRECTION

PATENT NO.          : 9,580,665 B2
APPLICATION NO.     : 14/123602
DATED               : February 28, 2017
INVENTOR(S)         : Olofsson et al.

It is certified that error appears in the above-identified patent and that said Letters Patent is hereby corrected as shown below:

On the Title Page

Page 2 item [57], Line 2: "rector." should read -- reactor. --

Signed and Sealed this
Twentieth Day of February, 2018

Andrei Iancu
*Director of the United States Patent and Trademark Office*